(12) United States Patent
Kushizaki et al.

(10) Patent No.: US 12,410,853 B2
(45) Date of Patent: Sep. 9, 2025

(54) DIFFERENTIAL GEAR

(71) Applicant: JTEKT CORPORATION, Kariya (JP)

(72) Inventors: Kenji Kushizaki, Kariya (JP);
Nobuyuki Watanabe, Kariya (JP);
Kenji Asami, Kariya (JP)

(73) Assignee: JTEKT CORPORATION, Kariya (JP)

( * ) Notice: Subject to any disclaimer, the term of this patent is extended or adjusted under 35 U.S.C. 154(b) by 0 days.

(21) Appl. No.: 18/709,894

(22) PCT Filed: Nov. 30, 2021

(86) PCT No.: PCT/JP2021/043840
§ 371 (c)(1),
(2) Date: May 14, 2024

(87) PCT Pub. No.: WO2023/100239
PCT Pub. Date: Jun. 8, 2023

(65) Prior Publication Data
US 2025/0027557 A1    Jan. 23, 2025

(51) Int. Cl.
*F16H 48/06* (2006.01)
*F16H 48/40* (2012.01)
*F16H 48/38* (2012.01)

(52) U.S. Cl.
CPC ............. *F16H 48/06* (2013.01); *F16H 48/40* (2013.01); *F16H 2048/387* (2013.01)

(58) Field of Classification Search
CPC ..... F16H 48/06; F16H 48/40; F16H 2048/387
See application file for complete search history.

(56) References Cited

U.S. PATENT DOCUMENTS 3,375,736 A * 4/1968 Saari ................... F16H 57/0483
475/252
9,366,333 B2   6/2016 Tsuda et al.
(Continued)

FOREIGN PATENT DOCUMENTS

| JP | 2015-203483 A | 11/2015 |
| JP | 2021-134806 A | 9/2021 |
| JP | 2021-173389 A | 11/2021 |

OTHER PUBLICATIONS

Machine translation of IDS cited art JP2021-173389, pp. 1-11. (Year: 2024).*

(Continued)

*Primary Examiner* — Tisha D Lewis
(74) *Attorney, Agent, or Firm* — Oblon, McClelland, Maier & Neustadt, L.L.P.

(57) ABSTRACT

A differential gear includes a first connecting member with straight-spline protrusions on its inner periphery; a second connecting member with straight-spline protrusions on its inner periphery; a first side gear; and a second side gear. The first side gear includes a first cylindrical portion coupled to the first connecting member by helical splines, and a first wall portion extending radially inward. The second side gear includes a second cylindrical portion coupled to the second connecting member by helical splines, and a second wall portion extending radially inward. The first wall portion of the first side gear protrudes radially inward beyond the straight-spline protrusions of the first connecting member, and the second wall portion of the second side gear protrudes radially inward beyond the straight-spline protrusions of the second connecting member.

3 Claims, 4 Drawing Sheets

(56) References Cited

U.S. PATENT DOCUMENTS

| | | | |
|---|---|---|---|
| 11,204,085 B2 | 12/2021 | Otani et al. | |
| 2009/0186739 A1* | 7/2009 | Fujii | F16H 48/285 475/248 |
| 2015/0219198 A1* | 8/2015 | Yanase | F16H 48/40 475/230 |
| 2015/0300482 A1 | 10/2015 | Tsuda et al. | |
| 2017/0082185 A1* | 3/2017 | Jin | F16H 48/285 |
| 2021/0262558 A1 | 8/2021 | Otani et al. | |

OTHER PUBLICATIONS

International Search Report issued on Feb. 15, 2022 in PCT/JP2021/043840 filed on Nov. 30, 2021, 2 pages.

* cited by examiner

DIFFERENTIAL GEAR

TECHNICAL FIELD

The present invention relates to differential gears for vehicles that distribute the driving force of a driving source to a pair of output shafts while allowing differential rotation between the output shafts.

BACKGROUND ART

Some differential gears that distribute the driving force of a driving source for a vehicle to a pair of output shafts while allowing differential rotation between the output shafts have been known to have a limited slip function to limit differential rotation between the output shafts. For example, a vehicle equipped with such a differential gear can transmit the driving force to a left wheel even when a right wheel slips. Travel stability is thus improved. The applicant of the present disclosure has proposed the differential gears with the limited slip function described in PTL 1, 2.

The differential gear described in PTL 1 includes: a first side gear and a second side gear that are disposed side by side in an axial direction; a plurality of pinion gear sets each composed of a first pinion gear meshing with the first side gear and a second pinion gear meshing with the second side gear; and a differential case holding the plurality of pinion gear sets. The first and second pinion gears and the first and second side gears are helical gears that generate an axial thrust force by meshing with each other. When torque is transferred from the differential case to a pair of output shafts, end faces of the first and second side gears are pressed against washers disposed in the differential case due to the thrust forces, generating frictional forces that reduce differential rotation between the pair of output shafts.

The differential gear described in PTL 2 includes, in addition to the above configuration, a first connecting member coupled to the first side gear by helical splines and a second connecting member coupled to the second side gear by helical spines in order to further increase differential limiting forces. When torque is transferred from the differential case to the pair of output shafts, the differential limiting forces increase due to the thrust forces additionally generated by the helical spline couplings.

In the differential gear described in PTL 1, an axle spacer is disposed between the first side gear and the second side gear. When assembling a vehicle, right and left axle shafts that are the pair of output shafts to be inserted through the first side gear and the second side gear, respectively, are caused to abut on both end faces of the axle spacer. The right and left axle shafts are thus positioned, which facilitates assembly of the vehicle. The differential gear described in PTL 2 does not include such an axle spacer.

CITATION LIST

Patent Literature

PTL 1: JP 2015-203483 A
PTL 2: JP 2021-173389 A

SUMMARY OF INVENTION

Technical Problem

The axle spacer of the differential gear described in PTL 1 contributes to facilitate assembly of the vehicle as described above. Once the vehicle is assembled, however, the axle spacer no longer performs any function, but rather obstructs the flow of lubricating oil in the differential case. The differential gear described in PTL 2 does not include an axle spacer. This can reduce the number of parts of the differential gear and the assembly time. However, the pair of output shafts (right and left axle shafts) is unable to be positioned by abutting on the axle spacer when assembling a vehicle.

The present invention was made in view of the above circumstances, and it is an object of the present invention to provide a differential gear that facilitates positioning of a pair of output shafts without using an axle spacer when assembling a vehicle.

Solution to Problem

In order to achieve the above object, the present invention provides a differential gear that distributes a driving force for a vehicle to a first output shaft and a second output shaft. The differential gear includes: a cylindrical first connecting member including, on an inner periphery of the first connecting member, a plurality of straight-spline protrusions to which the first output shaft is coupled by straight splines; a cylindrical second connecting member including, on an inner periphery of the second connecting member, a plurality of straight-spline protrusions to which the second output shaft is coupled by straight splines; a first side gear combined with the first connecting member; a second side gear combined with the second connecting member; a plurality of pinion gear sets each composed of a first pinion gear and a second pinion gear being meshed with each other, the first pinion gear meshing with the first side gear, and the second pinion gear meshing with the second side gear; a differential case that holds the plurality of pinion gear sets; and a center washer that is disposed between the first side gear and the second side gear, rotation of the center washer relative to the differential case being restricted. The first side gear includes: a first cylindrical portion disposed around an outer periphery of the first connecting member and coupled to the first connecting member by helical splines; and a first wall portion extending radially inward from one end on the center washer side of the first cylindrical portion, the first wall portion protruding radially inward beyond the plurality of straight-spline protrusions of the first connecting member. The second side gear includes: a second cylindrical portion disposed around an outer periphery of the second connecting member and coupled to the second connecting member by helical splines; and a second wall portion extending radially inward from one end on the center washer side of the second cylindrical portion, the second wall portion protruding radially inward beyond the plurality of straight-spline protrusions of the second connecting member. During driving in which torque is transferred from the first side gear and the second side gear to the first connecting member and the second connecting member, the center washer generates a frictional force between the center washer and each of the first wall portion of the first side gear and the second wall portion of the second side gear by a thrust force generated by coupling by the helical splines.

Advantageous Effects of Invention

The differential gear according to the present invention facilitates axial positioning of the first output shaft and the second output shaft without using an axle spacer when assembling a vehicle.

DESCRIPTION OF EMBODIMENTS

Embodiment

An embodiment of the present invention will be described with reference to FIGS. 1 to 3. The embodiment described below is shown as a suitable specific example for carrying out the present invention, and part of the embodiment specifically illustrates various technically preferable technical matters. However, the technical scope of the present invention is not limited to such specific aspects.

Figure 1:
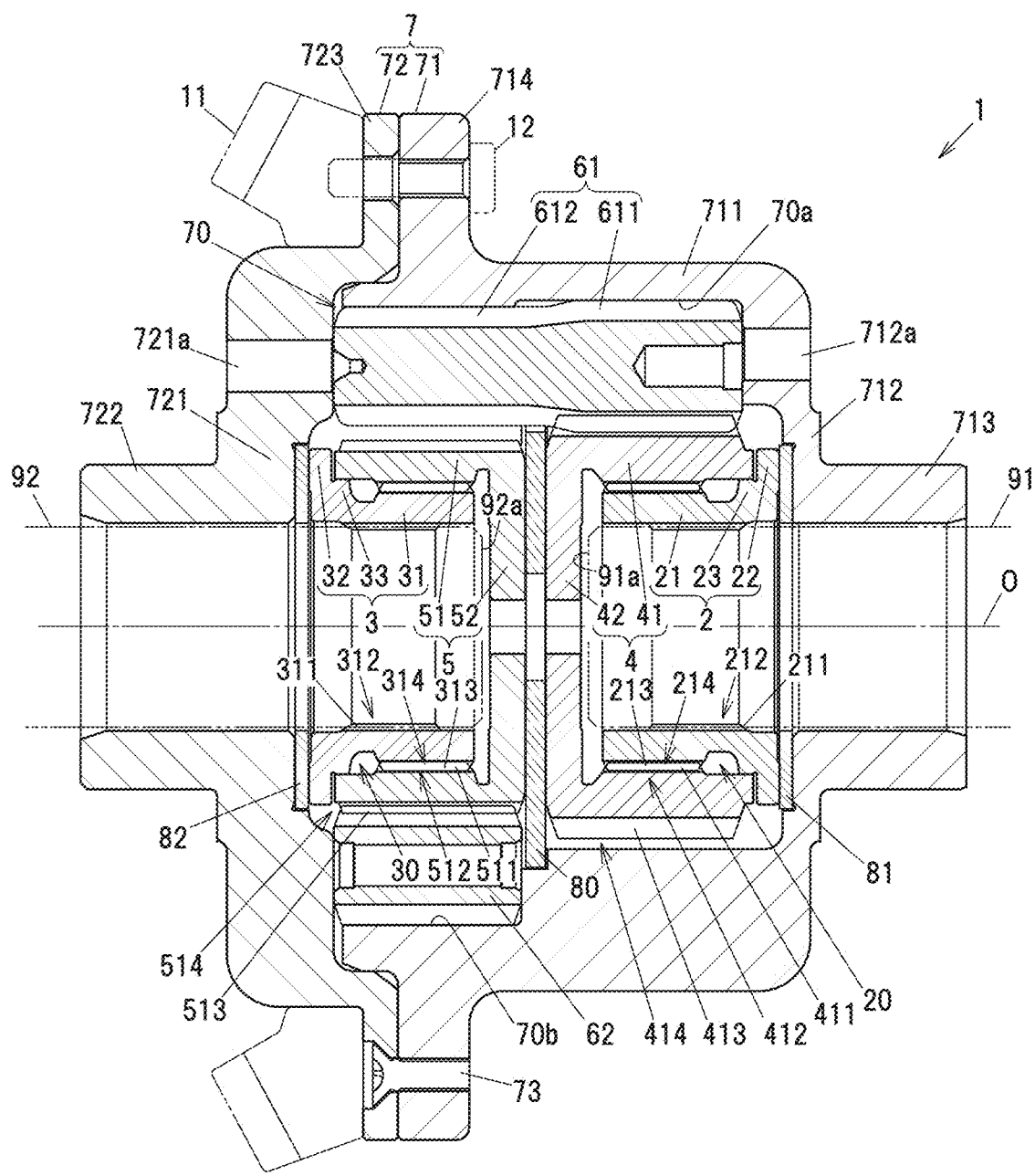
FIG. 1 is a sectional view showing an example of the configuration of a differential gear according to an embodiment of the present invention.

FIG. 1 is a sectional view showing an example of the configuration of a differential gear according to the embodiment of the present invention. FIG. 2 is an exploded perspective view of the differential gear.

A differential gear 1 is mounted on a vehicle and is used to distribute the driving force of a driving source to a first output shaft 91 and a second output shaft 92 while allowing differential rotation between these output shafts. In FIG. 1, the first output shaft 91 and the second output shaft 92 are shown by hidden outlines. The driving source is, for example, an engine that is an internal combustion engine, an electric motor, or a combination of an engine and an electric motor.

The differential gear 1 includes: a cylindrical first connecting member 2 that rotates with the first output shaft 91; a cylindrical second connecting member 3 that rotates with the second output shaft 92; a first side gear 4 combined with the first connecting member 2; a second side gear 5 combined with the second connecting member 3; a plurality of pinion gear sets 6; a differential case 7 holding the plurality of pinion gear sets 6; and a center washer 80, a first side washer 81, and a second side washer 82 that are held in the differential case 7 so as not to be rotatable relative to the differential case 7.

A ring gear 11 shown by hidden outlines in FIG. 1 is fixed to the differential case 7 with a plurality of bolts 12. The differential case 7 is rotated about a rotation axis O by the driving force of the driving source applied from the ring gear 11. The first connecting member 2, the second connecting member 3, the first side gear 4, and the second side gear 5 are rotatable relative to the differential case 7 about the rotation axis O. Hereinafter, a direction parallel to the rotation axis O will be referred to as axial direction. A direction perpendicular to the rotation axis O will be referred to as radial direction.

The differential case 7 includes a bottomed cylindrical case body 71 and a case lid 72 disposed so as to close an opening of the case body 71. The case body 71 and the case lid 72 are coupled with a plurality of bolts 73. The case body 71 is a single-piece member composed of: a cylindrical tube portion 711; a disc-shaped first sidewall portion 712 formed so as to extend radially inward from an end on one side in the axial direction of the tube portion 711; a cylindrical first extended portion 713 extended in the axial direction from the central portion of the first sidewall portion 712; and a first flange portion 714 formed so as to protrude radially outward from an end on the other side in the axial direction of the tube portion 711. An oil hole 712a for passing lubricating oil therethrough is formed in the first sidewall portion 712.

The case lid 72 is a single-piece member composed of: a disc-shaped second sidewall portion 721; a cylindrical second extended portion 722 extended in the axial direction from the central portion of the second sidewall portion 721; and a second flange portion 723 formed so as to protrude radially outward from the second sidewall portion 721. An oil hole 721a for passing lubricating oil therethrough is formed in the second sidewall portion 721.

The bolts 12 for fixing the ring gear 11 are inserted through the first flange portion 714 of the case body 71 and the second flange portion 723 of the case lid 72. The differential case 7 and the ring gear 11 are housed in a differential carrier, not shown, and the ring gear 11 is meshed with a pinion gear in the differential carrier. Bearings, not shown, are mounted around the first extended portion 713 and the second extended portion 722, and the differential case 7 is supported by the bearings so as to be rotatable relative to the differential carrier. Lubricating oil (differential oil) is sealed in the differential carrier.

The center washer 80 is held in the tube portion 711 of the case body 71. The first side washer 81 is held by the first sidewall portion 712 of the case body 71, and the second side washer 82 is held by the second sidewall portion 721 of the case lid 72. The center washer 80 is disposed between the first side gear 4 and the second side gear 5. The first side washer 81 is disposed at such a position that the first connecting member 2 and the first side gear 4 are sandwiched between the first side washer 81 and the center washer 80. The second side washer 82 is disposed at such a position that the second connecting member 3 and the second side gear 5 are sandwiched between the second side washer 82 and the center washer 80.

Figure 2:
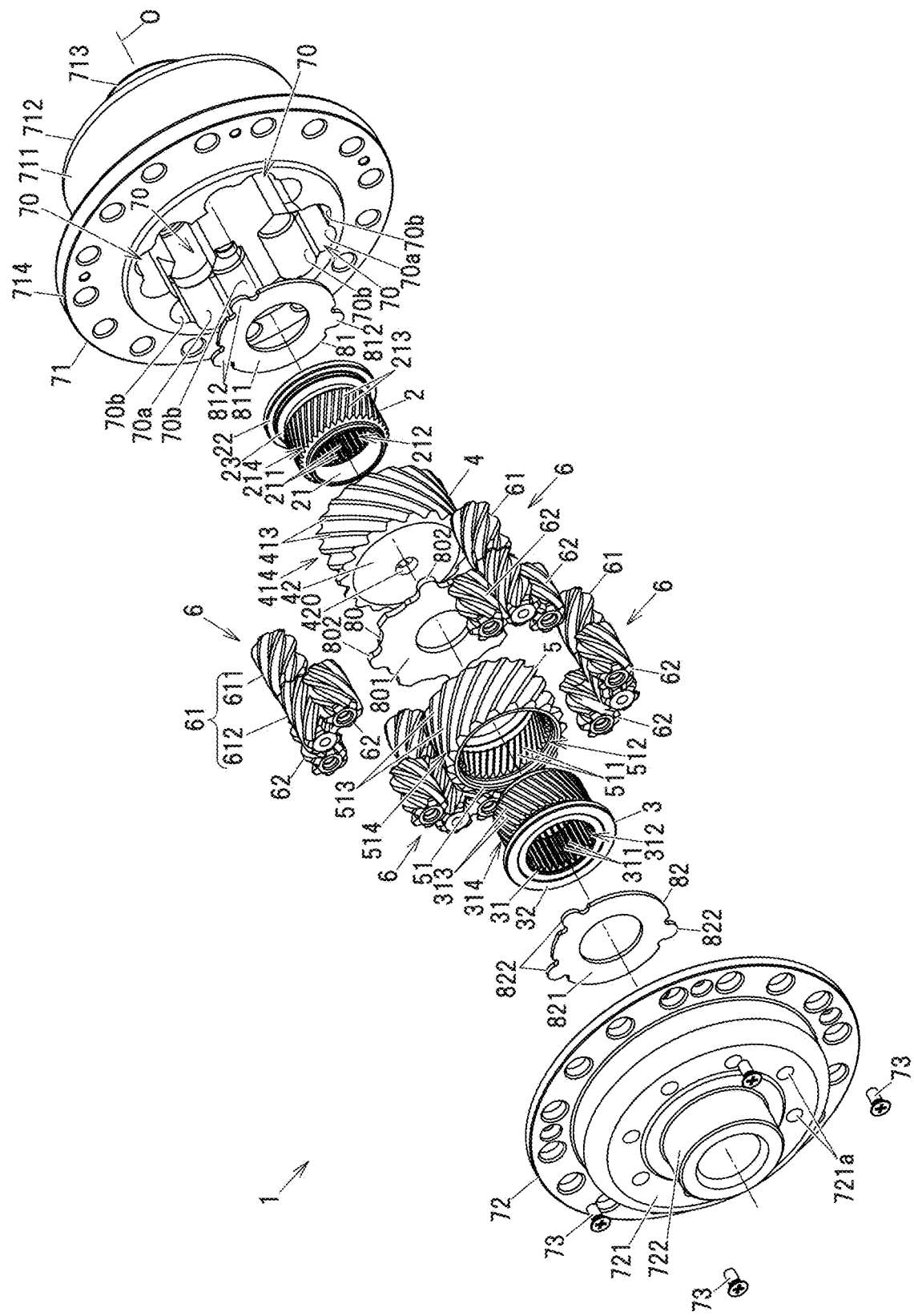
FIG. 2 is an exploded perspective view of the differential gear.

As shown in FIG. 2, each of the center washer 80, the first side washer 81, and the second side washer 82 has a disc-shaped disc portion 801, 811, 821 and a plurality of protruding portions 802, 812, 822 protruding radially outward from the outer edge of the disc-shaped disc portion 801, 811, 821. Rotation of the center washer 80 relative to the differential case 7 is restricted by the plurality of protruding portions 802 engaging with the tube portion 711 of the case body 71. Rotation of the first side washer 81 relative to the differential case 7 is restricted by the plurality of protruding portions 812 engaging with the first sidewall portion 712 of the case body 71. Rotation of the second side washer 82 relative to the differential case 7 is restricted by the plurality of protruding portions 822 engaging with the second sidewall portion 721 of the case lid 72.

In the present embodiment, four pinion gear sets 6 are housed in the differential case 7. Each pinion gear set 6 is composed of one first pinion gear 61 and two second pinion gears 62 meshing with each other. The first pinion gear 61 has a large diameter gear portion 611 and a small diameter gear portion 612 that are different in pitch circle diameter. The two second pinion gears 62 have a shorter axial length than the first pinion gear 61, and are meshed with the small diameter gear portion 612 of the first pinion gear 61.

Four bores 70 for holding the four pinion gear sets 6 are formed in the case body 71. The inner surface of each bore 70 includes a sliding surface 70a on which the tooth tips of the first pinion gear 61 slide, and sliding surfaces 70b on which the tooth tips of the second pinion gears 62 slide. When the vehicle travels straight, the first pinion gear 61 and the second pinion gears 62 rotate (revolve) with the differential case 7 without rotating about their axes in the bore 70. When the first output shaft 91 and the second output shaft 92 rotate differentially as the vehicle makes a turn etc., the first pinion gear 61 and the second pinion gears 62 rotate with the differential case 7 while rotating about their axes in the bore 70.

Figure 3:
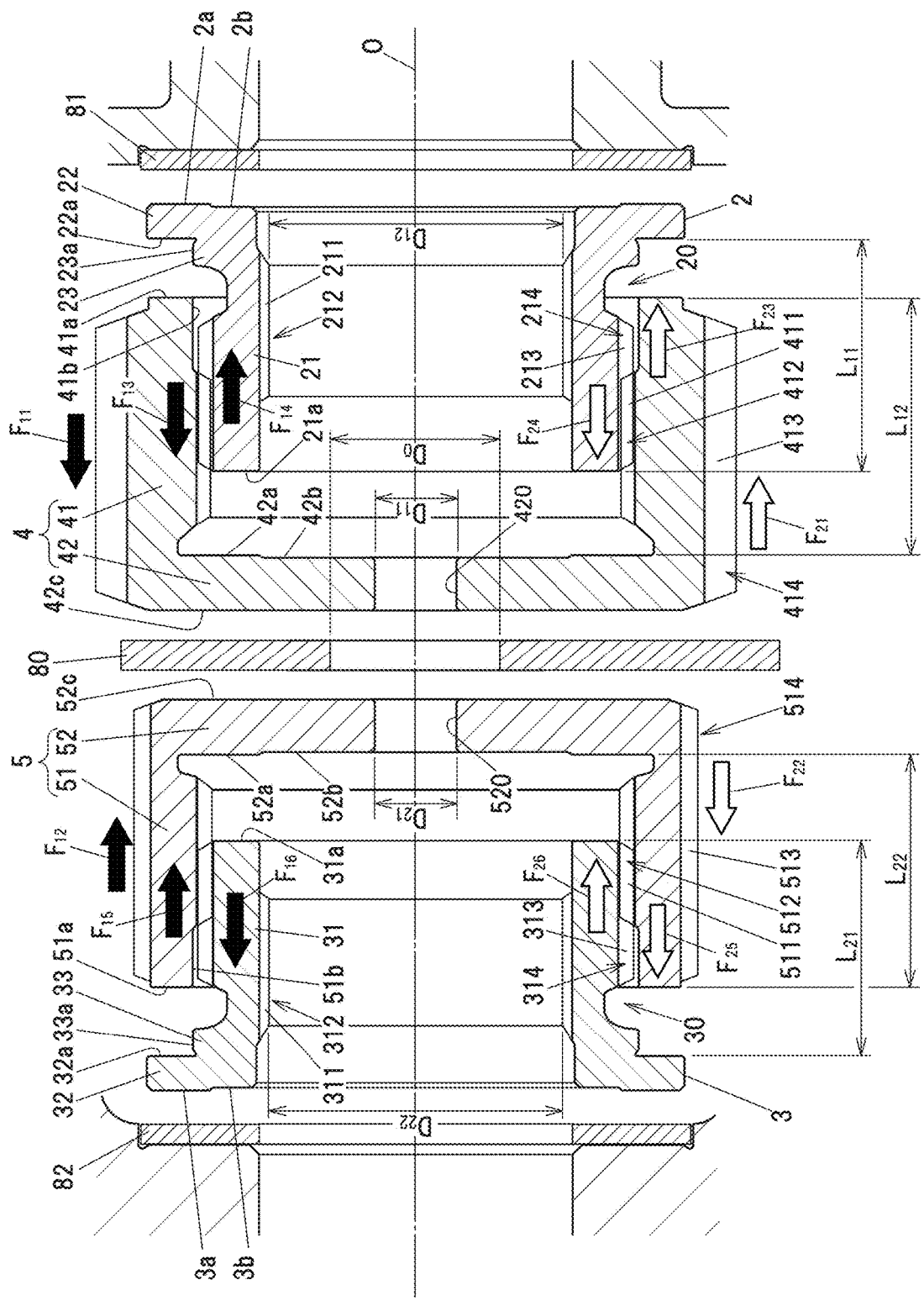
FIG. 3 illustrates a first connecting member, a second connecting member, a first side gear, a second side gear, a center washer, a first side washer, and a second side washer shown spaced apart from each other in an axial direction.

FIG. 3 illustrates the first connecting member 2, the second connecting member 3, the first side gear 4, the second side gear 5, the center washer 80, the first side washer 81, and the second side washer 82 shown spaced apart from each other in the axial direction.

The first connecting member 2 is a single-piece member composed of: a first tubular base portion 21 formed in a cylindrical shape; an annular first outer peripheral wall portion 22 formed so as to protrude radially outward from an end on the first side washer 81 side of the first tubular base portion 21; and an annular first support wall portion 23 formed adjacent to the first outer peripheral wall portion 22 so as to protrude radially outward from the first tubular base portion 21. A straight-spline fitting portion 212 having a plurality of straight-spline protrusions 211 extending in the axial direction is formed on the inner periphery of the first tubular base portion 21. A helical-spline fitting portion 214 having a plurality of helical-spline protrusions 213 tilted with respect to the axial direction is formed on the outer periphery of the first tubular base portion 21. An annular recess 20 for machining the plurality of helical-spline protrusions 213 is formed between the helical-spline fitting portion 214 and the first support wall portion 23.

Similarly, the second connecting member 3 is a single-piece member composed of: a second tubular base portion 31 formed in a cylindrical shape; an annular second outer peripheral wall portion 32 protruding radially outward from an end on the second side washer 82 side of the second tubular base portion 31; and an annular second support wall portion 33 formed adjacent to the second outer peripheral wall portion 32 so as to protrude radially outward from the second tubular base portion 31. A straight-spline fitting portion 312 having a plurality of straight-spline protrusions 311 extending in the axial direction is formed on the inner periphery of the second tubular base portion 31. A helical-spline fitting portion 314 having a plurality of helical-spline protrusions 313 tilted with respect to the axial direction is formed on the outer periphery of the second tubular base portion 31. An annular recess 30 for machining the plurality of helical-spline protrusions 313 is formed between the helical-spline fitting portion 314 and the second support wall portion 33.

The first output shaft 91 is inserted into the first tubular base portion 21 and is coupled to the plurality of straight-spline protrusions 211 of the straight-spline fitting portion 212 by straight splines. The second output shaft 92 is inserted into the second tubular base portion 31 and is coupled to the plurality of straight-spline protrusions 311 of the straight-spline fitting portion 312 by straight splines.

The first side gear 4 is a single-piece member composed of: a first cylindrical portion 41 disposed around the outer periphery of the first connecting member 2 and coupled to the first connecting member 2 by helical splines; and a first wall portion 42 extending radially inward from one end on the center washer 80 side of the first cylindrical portion 41. A helical-spline fitting portion 412 having a plurality of helical-spline protrusions 411 tilted with respect to the axial direction is formed on the inner periphery of the first cylindrical portion 41. A helical gear portion 414 having a plurality of helical teeth 413 tilted with respect to the axial direction is formed on the outer periphery of the first cylindrical portion 41.

Similarly, the second side gear 5 is a single-piece member composed of: a second cylindrical portion 51 disposed around the outer periphery of the second connecting member 3 and coupled to the second connecting member 3 by helical splines; and a second wall portion 52 extending radially inward from one end on the center washer 80 side of the second cylindrical portion 51. A helical-spline fitting portion 512 having a plurality of helical-spline protrusions 511 tilted with respect to the axial direction is formed on the inner periphery of the second cylindrical portion 51. A helical gear portion 514 having a plurality of helical teeth 513 tilted with respect to the axial direction is formed on the outer periphery of the second cylindrical portion 51.

The helical-spline fitting portion 412 of the first side gear 4 is fitted on the helical-spline fitting portion 214 of the first connecting member 2, and the plurality of helical-spline protrusions 411 of the first side gear 4 and the plurality of helical-spline protrusions 213 of the first connecting member 2 are meshed with each other. The helical gear portion 414 of the first side gear 4 meshes with the large diameter gear portion 611 of the first pinion gear 61. When torque is transferred from the differential case 7 to the first output shaft 91, the helical-spline fitting portion 412 and helical gear portion 414 of the first side gear 4 and the helical-spline fitting portion 214 of the first connecting member 2 are subjected to an axial thrust force.

Similarly, the helical-spline fitting portion 512 of the second side gear 5 is fitted on the helical-spline fitting portion 314 of the second connecting member 3, and the plurality of helical-spline protrusions 511 of the second side gear 5 and the plurality of helical-spline protrusions 313 of the second connecting member 3 are meshed with each other. The helical gear portion 514 of the second side gear 5 meshes with the second pinion gears 62. When torque is transferred from the differential case 7 to the second output shaft 92, the helical-spline fitting portion 512 and helical gear portion 514 of the second side gear 5 and the helical-spline fitting portion 314 of the second connecting member 3 are subjected to an axial thrust force.

As shown in FIG. 3, an end face 22a on the center washer 80 side of the first outer peripheral wall portion 22 of the first connecting member 2 faces an end face 41a on the opposite side of the first cylindrical portion 41 of the first side gear 4 from the center washer 80 (on the first side washer 81 side) in the axial direction. The end face 22a of the first outer peripheral wall portion 22 and the end face 41a of the first cylindrical portion 41 are flat surfaces perpendicular to the axial direction. An inner peripheral surface 41b of an end on the first side washer 81 side of the first cylindrical portion 41 of the first side gear 4 faces an outer peripheral surface 23a of the first support wall portion 23 of the first connecting member 2 in the radial direction. With the outer peripheral surface 23a being in contact with the inner peripheral surface 41b of the first cylindrical portion 41, the first support wall portion 23 stabilizes the attitude of the first side gear 4 with respect to the first connecting member 2.

An end face 32a on the center washer 80 side of the second outer peripheral wall portion 32 of the second connecting member 3 faces an end face 51a on the opposite side of the second cylindrical portion 51 of the second side gear 5 from the center washer 80 (on the second side washer 82 side) in the axial direction. The end face 32a of the second outer peripheral wall portion 32 and the end face 51a of the second cylindrical portion 51 are flat surfaces perpendicular to the axial direction. An inner peripheral surface 51b of an end on the second side washer 82 side of the second cylindrical portion 51 of the second side gear 5 faces an outer peripheral surface 33a of the second support wall portion 33 of the second connecting member 3 in the radial direction. With the outer peripheral surface 33a being in contact with the inner peripheral surface 51b of the second cylindrical portion 51, the second support wall portion 33 stabilizes the attitude of the second side gear S with respect to the second connecting member 3.

A surface on the first side washer 81 side of the first connecting member 2 includes an abutting surface 2a that generates a frictional force through frictional contact with the first side washer 81, and a non-contact surface 2b that does not contact the first side washer 81. The abutting surface 2a and the non-contact surface 2b are annular flat surfaces perpendicular to the axial direction, and the abutting surface 2a is formed radially outward of the non-contact surface 2b. The abutting surface 2a protrudes toward the first side washer 81 with respect to the non-contact surface 2b. An end face 21a on the center washer 80 side of the first tubular base portion 21 of the first connecting member 2 faces the first wall portion 42 of the first side gear 4 in the axial direction.

Similarly, a surface on the second side washer 82 side of the second connecting member 3 includes an abutting surface 3a that generates a frictional force through frictional contact with the second side washer 82, and a non-contact surface 3b that does not contact the second side washer 82. The abutting surface 3a and the non-contact surface 3b are annular flat surfaces perpendicular to the axial direction, and the abutting surface 3a is formed radially outward of the non-contact surface 3b. The abutting surface 3a protrudes toward the second side washer 82 with respect to the non-contact surface 3b. An end face 31a on the center washer 80 side of the second tubular base portion 31 of the second connecting member 3 faces the second wall portion 52 of the second side gear 5 in the axial direction.

The first wall portion 42 of the first side gear 4 protrudes radially inward beyond the plurality of straight-spline protrusions 211 of the first connecting member 2. When assembling a vehicle on which the differential gear 1 is mounted, the first output shaft 91 is inserted into the first extended portion 713 of the differential case 7 and the first connecting member 2 to abut on the first wall portion 42 of the first side gear 4. A through hole 420 extending through the first wall portion 42 in the axial direction is formed in the central portion of the first side gear 4. As shown in FIG. 3, $D_{11}$ represents the inner diameter of the through hole 420 of the first side gear 4, and $D_{12}$ represents the inner diameter of the straight-spline fitting portion 212 of the first connecting member 2. The inner diameter $D_{11}$ of the through hole 420 is smaller than the inner diameter $D_{12}$ of the straight-spline fitting portion 212.

A surface on the opposite side of the first wall portion 42 of the first side gear 4 from the center washer 80 includes a first opposing surface 42a that faces the end face 21a of the first tubular base portion 21 of the first connecting member 2, and a first abutting surface 42b on which a distal end face 91a (see FIG. 1) of the first output shaft 91 abuts. The first abutting surface 42b is formed on a portion of the first wall portion 42 that protrudes radially inward beyond the plurality of straight-spline protrusions 211 of the first connecting member 2. The first abutting surface 42b has been subjected to a finishing process for improving the dimensional accuracy of the first output shaft 91 when the distal end face 91a of the first output shaft 91 is caused to abut on the first abutting surface 42b. The first abutting surface 42b has thus been slightly offset toward the center washer 80 with respect to the first opposing surface 42a.

Similarly, the second wall portion 52 of the second side gear 5 protrudes radially inward beyond the plurality of straight-spline protrusions 311 of the second connecting member 3. When assembling the vehicle on which the differential gear 1 is mounted, the second output shaft 92 is inserted into the second extended portion 722 of the differential case 7 and the second connecting member 3 to abut on the second wall portion 52 of the second side gear 5. A through hole 520 extending through the second wall portion 52 in the axial direction is formed in the central portion of the second side gear 5. As shown in FIG. 3, $D_{21}$ represents the inner diameter of the through hole 520 of the second side gear 5, and $D_{22}$ represents the inner diameter of the straight-spline fitting portion 312 of the second connecting member 3. The inner diameter $D_{21}$ of the through hole 520 is smaller than the inner diameter $D_{22}$ of the straight-spline fitting portion 312.

A surface on the opposite side of the second wall portion 52 of the second side gear 5 from the center washer 80 includes a second opposing surface 52a that faces the end face 31a of the second tubular base portion 31 of the second connecting member 3, and a second abutting surface 52b on which a distal end face 92a (see FIG. 1) of the second output shaft 92 abuts. The second abutting surface 52b is formed on a portion of the second wall portion 52 that protrudes radially inward beyond the plurality of straight-spline protrusions 311 of the second connecting member 3. The second abutting surface 52b has been subjected to a finishing process for improving the dimensional accuracy of the second output shaft 92 when the distal end face 92a of the second output shaft 92 is caused to abut on the second abutting surface 52b. The second abutting surface 52b has thus been slightly offset toward the center washer 80 with respect to the second opposing surface 52a.

The first output shaft 91 is temporarily caused to abut on the first wall portion 42 of the first side gear 4 when assembling the vehicle. However, when the assembly is completed, the first output shaft 91 is positioned away from the first wall portion 42 of the first side gear 4 in the axial direction, and does not contact the first wall portion 42. Similarly, the second output shaft 92 is temporarily caused to abut on the second wall portion 52 of the second side gear 5 when assembling the vehicle. However, when the assembly is completed, the second output shaft 92 is positioned away from the second wall portion 52 of the second side gear 5 in the axial direction, and does not contact the second wall portion 52.

During driving in which the vehicle accelerates in a forward direction or moves forward at a constant speed, torque is transferred from the first side gear 4 to the first connecting member 2 and from the second side gear 5 to the second connecting member 3. On the other hand, during coasting in which the vehicle decelerates by engine braking or regenerative braking of an electric motor while traveling forward, torque is transferred from the first connecting member 2 to the first side gear 4 and from the second connecting member 3 to the second side gear 5. However, the torque that is transferred between the first side gear 4 and the first connecting member 2 and between the second side gear 5 and the second connecting member 3 is relatively smaller during coasting than during driving.

In FIG. 3, the directions of axial thrust forces $F_{11}$ to $F_{16}$ that are generated on the first connecting member 2, the second connecting member 3, the first side gear 4, and the second side gear 5 during driving are shown by black arrows. In FIG. 3, the directions of axial thrust forces $F_{21}$ to $F_{26}$ that are generated on the first connecting member 2, the second connecting member 3, the first side gear 4, and the second side gear 5 during coasting are shown by white arrows. During driving, the thrust force $F_{11}$ toward the center washer 80 is generated on the first side gear 4 by the meshing between the helical gear portion 414 of the first side gear 4 and the large diameter gear portion 611 of the first pinion gear 61, and the thrust force $F_{12}$ toward the center washer 80 is generated on the second side gear 5 by the meshing between the helical gear portion 514 of the second side gear 5 and the second pinion gear 62.

During driving, the thrust force $F_{13}$ toward the center washer 80 is generated on the first side gear 4 and the thrust force $F_{14}$ toward the first side washer 81 is generated on the first connecting member 2, both by the fitting between the helical-spline fitting portion 412 of the first side gear 4 and the helical-spline fitting portion 214 of the first connecting member 2. In addition, during driving, the thrust force $F_{15}$ toward the center washer 80 is generated on the second side gear S and the thrust force $F_{16}$ toward the second side washer 82 is generated on the second connecting member 3, both by the fitting between the helical-spline fitting portion 512 of the second side gear 5 and the helical-spline fitting portion 314 of the second connecting member 3.

An abutting surface 42c that faces the center washer 80 in the axial direction and that abuts on the center washer 80 during driving is formed on a surface on the center washer 80 side of the first wall portion 42 of the first side gear 4. An abutting surface 52c that faces the center washer 80 in the axial direction and that abuts on the center washer 80 during driving is formed on a surface on the center washer 80 side of the second wall portion 52 of the second side gear 5.

During driving, the center washer 80 generates a frictional force between the center washer 80 and the first wall portion 42 of the first side gear 4 by the thrust force $F_{11}$ generated on the first side gear 4 by the meshing between the first side gear 4 and the first pinion gear 61 and the thrust force $F_{13}$ generated on the first side gear 4 by the helical spline coupling between the first side gear 4 and the first connecting member 2.

During driving, the center washer 80 generates a frictional force between the center washer 80 and the second wall portion 52 of the second side gear 5 by the thrust force $F_{12}$ generated on the second side gear 5 by the meshing between the second side gear 5 and the second pinion gear 62 and the thrust force $F_{15}$ generated on the second side gear 5 by the helical spline coupling between the second side gear 5 and the second connecting member 3.

During driving, the first side washer 81 generates a frictional force between the first side washer 81 and the first connecting member 2 by the thrust force $F_{14}$ generated on the first connecting member 2 by the helical spline coupling between the first side gear 4 and the first connecting member 2. During driving, the second side washer 82 generates a frictional force between the second side washer 82 and the second connecting member 3 by the thrust force $F_{16}$ generated on the second connecting member 3 by the helical spline coupling between the second side gear 5 and the second connecting member 3. The frictional forces generated by these thrust forces $F_{11}$ to $F_{16}$ serve as differential limiting forces that limit differential rotation between the first output shaft 91 and the second output shaft 92 during driving.

On the other hand, during coasting, the thrust force $F_{21}$ toward the first side washer 81 is generated on the first side gear 4 by the meshing between the first side gear 4 and the first pinion gear 61. The first outer peripheral wall portion 22 of the first connecting member 2 receives this thrust force $F_{21}$ from the end face 41a of the first cylindrical portion 41, so that the abutting surface 2a of the first connecting member 2 abuts on the first side washer 81 and a frictional force is generated. However, the thrust force $F_{23}$ and the thrust force $F_{24}$ that are generated on the first side gear 4 and the first connecting member 2 by the helical spline coupling between the first side gear 4 and the first connecting member 2 cancel each other out due to the end face 41a of the first cylindrical portion 41 of the first side gear 4 abutting on the end face 22a of the first outer peripheral wall portion 22 of the first connecting member 2.

During coasting, the thrust force $F_{22}$ toward the second side washer 82 is generated on the second side gear 5 by the meshing between the second side gear 5 and the second pinion gear 62. The second outer peripheral wall portion 32 of the second connecting member 3 receives this thrust force $F_{22}$ from the end face 51a of the second cylindrical portion 51, so that the abutting surface 3a of the second connecting member 3 abuts on the second side washer 82 and a frictional force is generated. However, the thrust force $F_{25}$ and the thrust force $F_{26}$ that are generated on the second side gear 5 and the second connecting member 3 by the helical spline coupling between the second side gear 5 and the second connecting member 3 cancel each other out due to the end face 51a of the second cylindrical portion 51 of the second side gear S abutting on the end face 32a of the second outer peripheral wall portion 32 of the second connecting member 3.

As described above, during coasting, the thrust force $F_{23}$ and the thrust force $F_{24}$ that are generated by the helical spline coupling between the first side gear 4 and the first connecting member 2 cancel each other out, and the thrust force $F_{25}$ and the thrust force $F_{26}$ that are generated by the helical spline coupling between the second side gear 5 and the second connecting member 3 cancel each other out. Therefore, even when torque that is transferred between the first side gear 4 and the first connecting member 2 and between the second side gear 5 and the second connecting member 3 is the same between during driving and during coasting, the differential limiting forces that are generated during coasting are smaller than the differential limiting forces that are generated during driving. The differential limiting forces that are generated during driving and the differential limiting forces that are generated during coasting are thus different in magnitude.

During driving, the first wall portion 42 of the first side gear 4 is pressed against the center washer 80 by the resultant force of the thrust force $F_{11}$ generated by the meshing between the first side gear 4 and the first pinion gear 61 and the thrust force $F_{13}$ generated by the helical spline coupling between the first side gear 4 and the first connecting member 2. Therefore, if the contact area between the first side gear 4 and the center washer 80 is small, heat generation and wear tend to occur at the contact surface therebetween. In the present embodiment, however, the first wall portion 42 of the first side gear 4 protrudes radially inward beyond the plurality of straight-spline protrusions 211 of the first connecting member 2, so that the first wall portion 42 has a large abutting surface 42c that abuts on the center washer 80. This reduces heat generation and wear caused by the friction between the first wall portion 42 of the first side gear 4 and the center washer 80.

During driving, the second wall portion 52 of the second side gear 5 is pressed against the center washer 80 by the resultant force of the thrust force $F_{21}$ generated by the meshing between the second side gear 5 and the second pinion gear 62 and the thrust force $F_{25}$ generated by the helical spline coupling between the second side gear 5 and the second connecting member 3. In the present embodiment, the second wall portion 52 of the second side gear 5 protrudes radially inward beyond the plurality of straight-spline protrusions 311 of the second connecting member 3, so that the second wall portion 52 has a large abutting surface 52c that abuts on the center washer 80. This reduces heat generation and wear caused by the friction between the second wall portion 52 of the second side gear 5 and the center washer 80.

The through hole 420 of the first side gear 4 and the through hole 520 of the second side gear 5 function as oil holes through which lubricating oil flows in the differential case 7. The inner diameter $D_0$ of the center washer 80 is larger than the inner diameter $D_{11}$ of the through hole 420 and the inner diameter $D_{21}$ of the through hole 520, and is large enough not to obstruct the flow of lubricating oil through the through holes 420, 520. The through hole 420 of the first side gear 4 and the through hole 520 of the second side gear 5 are also used to remove swarf generated when cutting the plurality of helical-spline protrusions 411, 511 during manufacturing of the first side gear 4 and the second side gear 5.

The inner diameter $D_0$ of the center washer 80 is smaller than the inner diameter $D_{12}$ of the straight-spline fitting portion 212 of the first connecting member 2 and the inner diameter $D_{22}$ of the straight-spline fitting portion 312 of the second connecting member 3. This provides large contact areas between each of the first wall portion 42 of the first side gear 4 and the second wall portion 52 of the second side gear 5 and the center washer 80.

As shown in FIG. 3, $L_{12}$ is larger than $L_{11}$, where $L_{11}$ is the axial length between the end face 21a of the first tubular base portion 21 and the end face 22a of the first outer peripheral wall portion 22 in the first connecting member 2, and $L_{12}$ is the axial length between the end face 41a of the first cylindrical portion 41 and the first opposing surface 42a of the first wall portion 42 in the first side gear 4. Therefore, there is always clearance between the end face 21a of the first tubular base portion 21 and the first opposing surface 42a of the first wall portion 42, so that the first connecting member 2 does not contact the first wall portion 42 of the first side gear 4. As a result, the end face 21a of the first tubular base portion 21 and the first opposing surface 42a of the first wall portion 42 need not be subjected to turning etc., and for example, may be left as forged.

Similarly, $L_{22}$ is larger than $L_{21}$, where $L_{21}$ is the axial length between the end face 31a of the second tubular base portion 31 and the end face 32a of the second outer peripheral wall portion 32 in the third connecting member 3, and $L_{22}$ is the axial length between the end face 51a of the second cylindrical portion 51 and the second opposing surface 52a of the second wall portion 52 in the second side gear 5. Therefore, there is always clearance between the end face 31a of the second tubular base portion 31 and the second opposing surface 52a of the second wall portion 52, so that the second connecting member 3 does not contact the second wall portion 52 of the second side gear 5. As a result, the end face 31a of the second tubular base portion 31 and the second opposing surface 52a of the second wall portion 52 need not be subjected to turning etc., and for example, may be left as forged.

Figure 4:
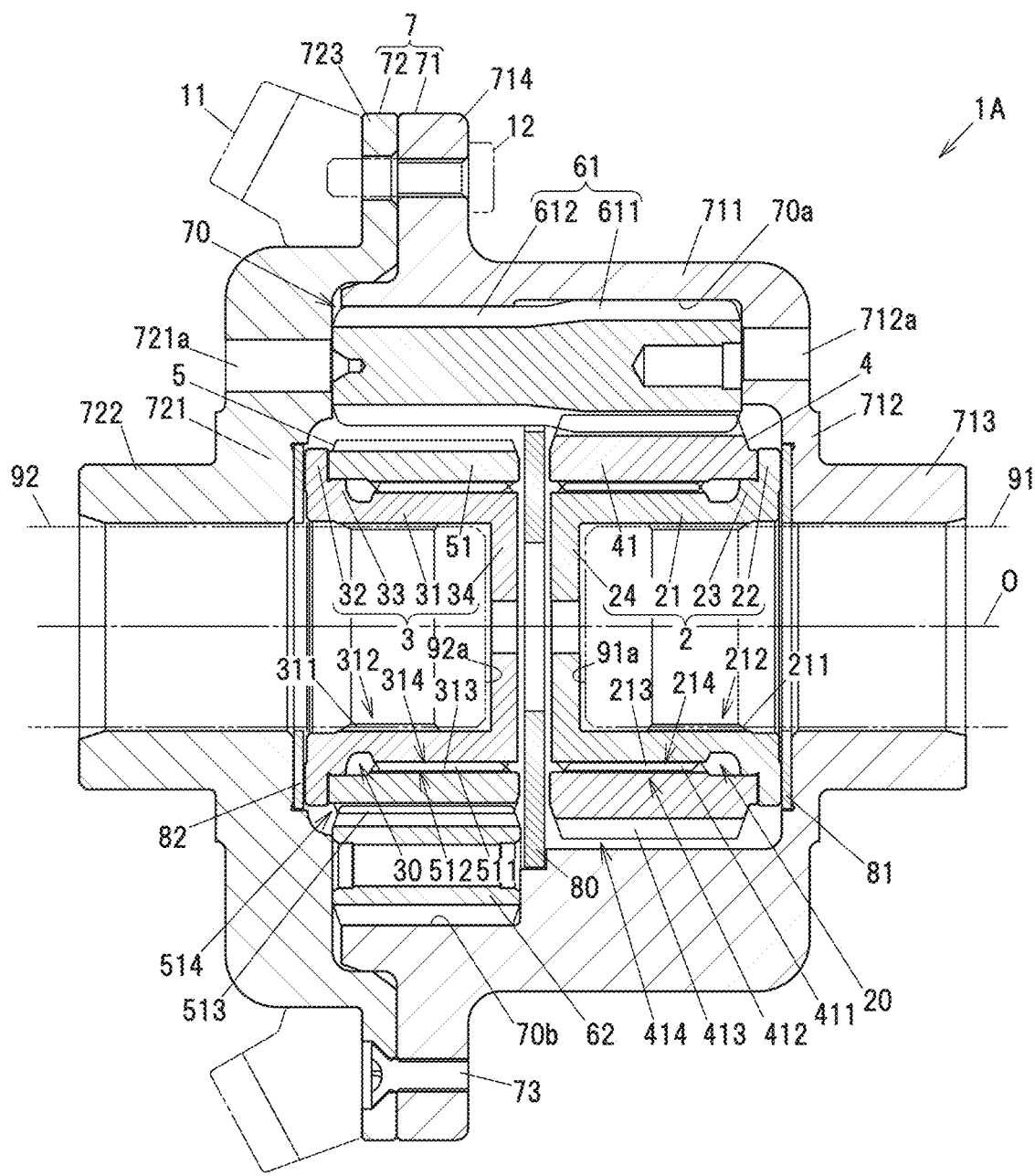
FIG. 4 is a sectional view showing an example of the configuration of a differential gear according to a comparative example.

FIG. 4 is a sectional view showing a differential gear 1A according to a comparative example. In this differential gear 1A, the first side gear 4 does not have the first wall portion 42, and the second side gear 5 does not have the second wall portion 52. However, the first connecting member 2 has a first wall portion 24 extending radially inward from an end on the center washer 80 side of the first tubular base portion 21, and the second connecting member 3 has a second wall portion 34 extending radially inward from an end on the center washer 80 side of the second tubular base portion 31. The configuration is otherwise the same as the configuration of the differential gear 1 according to the above embodiment. Therefore, in FIG. 4, the same components as those of the differential gear 1 are denoted by the same signs as those in FIG. 2, and repetitive description will be omitted.

With the differential gear 1A according to the comparative example, the first output shaft 91 can be caused to abut on the first wall portion 24 of the first connecting member 2 and the second output shaft 92 can be caused to abut on the second wall portion 34 of the third connecting member 3 when assembling a vehicle. However, the contact areas between each of the first side gear 4 and the second side gear 5 and the center washer 80 during driving are smaller than in the differential gear 1 according to the embodiment, and heat generation and wear tend to occur at the contact surfaces between each of the first side gear 4 and the second side gear 5 and the center washer 80. The first wall portion 24 and the second wall portion 34 no longer perform any function once the vehicle is assembled.

In contrast, in the differential gear 1 according to the present embodiment, the first side gear 4 has the first wall portion 42 and the second side gear S has the second wall portion 52. This facilitates positioning of the first output shaft 91 and the second output shaft 92 when assembling the vehicle. Moreover, the first wall portion 42 and the second wall portion 52 can increase the contact areas between each of the first side gear 4 and the second side gear 5 and the center washer 80. Heat generation and wear can thus be reduced.

In the differential gear 1 according to the present embodiment, the through hole 420 of the first side gear 4 and the through hole 520 of the second side gear 5 function as oil holes through which lubricating oil flows in the differential case 7. This reduces heat generation and wear of the frictional sliding portions in the differential case 7 due to improved lubricity.

Moreover, in the differential gear 1 according to the embodiment, the first connecting member 2 does not contact the first wall portion 42 of the first side gear 4, and the second connecting member 3 does not contact the second wall portion 52 of the second side gear 5. Accordingly, machining of the end face 21a of the first tubular base portion 21, the end face 31a of the second tubular base portion 31, the first opposing surface 42a of the first wall portion 42, and the second opposing surface 52a of the second wall portion 52 can be omitted, so that machining cost can be reduced.

Additional Notes

Although the present invention is described above based on the embodiment, the embodiment is not intended to limit the invention according to the claims. It should be noted that not all the combinations of features described in the embodiment are essential to means for solving the problem in the invention. The present invention can be modified as appropriate by omitting part of the configurations or adding or replacing configurations without departing from the spirit and scope of the present invention.

REFERENCE SIGNS LIST

1 DIFFERENTIAL GEAR
2 FIRST CONNECTING MEMBER
21 FIRST TUBULAR BASE PORTION
211 STRAIGHT-SPLINE PROTRUSION
213 HELICAL-SPLINE PROTRUSION
22 FIRST OUTER PERIPHERAL WALL PORTION
22A END FACE
3 SECOND CONNECTING MEMBER
31 SECOND TUBULAR BASE PORTION
311 STRAIGHT-SPLINE PROTRUSION
313 HELICAL-SPLINE PROTRUSION
32 SECOND OUTER PERIPHERAL WALL PORTION
32A END FACE
4 FIRST SIDE GEAR
41 FIRST CYLINDRICAL PORTION
41A END FACE
411 HELICAL-SPLINE PROTRUSION
42 FIRST WALL PORTION
420 THROUGH HOLE
5 SECOND SIDE GEAR
51 SECOND CYLINDRICAL PORTION
51A END FACE
511 HELICAL-SPLINE PROTRUSION
52 SECOND WALL PORTION
520 THROUGH HOLE
6 PINION GEAR SET
61 FIRST PINION GEAR
62 SECOND PINION GEAR
7 DIFFERENTIAL CASE
80 CENTER WASHER
91 FIRST OUTPUT SHAFT
92 SECOND OUTPUT SHAFT

The invention claimed is:

1. A differential gear that distributes a driving force for a vehicle to a first output shaft and a second output shaft, the differential gear comprising:
   a cylindrical first connecting member including, on an inner periphery of the first connecting member, a plurality of straight-spline protrusions to which the first output shaft is coupled by straight splines;
   a cylindrical second connecting member including, on an inner periphery of the second connecting member, a plurality of straight-spline protrusions to which the second output shaft is coupled by straight splines;
   a first side gear combined with the first connecting member;
   a second side gear combined with the second connecting member;
   a plurality of pinion gear sets each composed of a first pinion gear and a second pinion gear being meshed with each other, the first pinion gear meshing with the first side gear, and the second pinion gear meshing with the second side gear;
   a differential case that holds the plurality of pinion gear sets; and
   a center washer that is disposed between the first side gear and the second side gear, rotation of the center washer relative to the differential case being restricted, wherein
   the first side gear is formed with: a first cylindrical portion disposed around an outer periphery of the first connecting member and coupled to the first connecting member by helical splines; and a first wall portion extending radially inward from one end on the center washer side of the first cylindrical portion, the first wall portion protruding radially inward beyond the plurality of straight-spline protrusions of the first connecting member,
   the second side gear is formed with: a second cylindrical portion disposed around an outer periphery of the second connecting member and coupled to the second connecting member by helical splines; and a second wall portion extending radially inward from one end on the center washer side of the second cylindrical portion, the second wall portion protruding radially inward beyond the plurality of straight-spline protrusions of the second connecting member, and
   during driving in which torque is transferred from the first side gear and the second side gear to the first connecting member and the second connecting member, the center washer generates a frictional force between the center washer and each of the first wall portion of the first side gear and the second wall portion of the second side gear by a thrust force generated by coupling by the helical splines.

2. The differential gear according to claim 1, wherein
   a through hole extending through the first wall portion in an axial direction is located in a central portion of the first side gear, and
   a through hole extending through the second wall portion in the axial direction is located in a central portion of the second side gear.

3. The differential gear according to claim 1, wherein
   the first connecting member includes an annular first outer peripheral wall portion that faces an end face on an opposite side of the first cylindrical portion of the first side gear from the center washer in an axial direction,
   the second connecting member includes an annular second outer peripheral wall portion that faces an end face on an opposite side of the second cylindrical portion of the second side gear from the center washer in the axial direction, and
   during coasting in which torque is transferred from the first connecting member and the second connecting member to the first side gear and the second side gear, the end face of the first cylindrical portion and the first outer peripheral wall portion abut on each other, the end face of the second cylindrical portion and the second outer peripheral wall portion abut on each other, the first connecting member and the first wall portion do not abut on each other, and the second connecting member and the second wall portion do not abut on each other.

* * * * *

UNITED STATES PATENT AND TRADEMARK OFFICE
CERTIFICATE OF CORRECTION

| | | |
|---|---|---|
| PATENT NO. | : 12,410,853 B2 | Page 1 of 1 |
| APPLICATION NO. | : 18/709894 | |
| DATED | : September 9, 2025 | |
| INVENTOR(S) | : Kenji Kushizaki et al. | |

It is certified that error appears in the above-identified patent and that said Letters Patent is hereby corrected as shown below:

On the Title Page

Item (72) should read:
-- (72) Inventors: Kenji Kushizaki, Tokorozawa (JP);
　　　　　　　　　Nobuyuki Watanabe, Utsunomiya (JP);
　　　　　　　　　Kenji Asami, Hiki (JP) --

Signed and Sealed this
Eleventh Day of November, 2025

John A. Squires
*Director of the United States Patent and Trademark Office*